United States Patent
Mohammad et al.

(10) Patent No.: US 11,270,012 B2
(45) Date of Patent: Mar. 8, 2022

(54) ENCRYPTION KEY SHARES TO DIFFERENT DEVICES FOR RENDERING

(71) Applicant: HEWLETT-PACKARD DEVELOPMENT COMPANY, L.P., Houston, TX (US)

(72) Inventors: Nassir Mohammad, Bristol (GB); Jonathan Griffin, Bristol (GB); Gurchetan Grewal, Bristol (GB); Luke T. Mather, Bristol (GB); Joshua Serratelli Schiffman, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 782 days.

(21) Appl. No.: 16/076,544

(22) PCT Filed: Apr. 21, 2017

(86) PCT No.: PCT/US2017/028737
§ 371 (c)(1),
(2) Date: Aug. 8, 2018

(87) PCT Pub. No.: WO2018/194634
PCT Pub. Date: Oct. 25, 2018

(65) Prior Publication Data
US 2021/0200887 A1    Jul. 1, 2021

(51) Int. Cl.
*G06F 21/00* (2013.01)
*G06F 21/62* (2013.01)
(Continued)

(52) U.S. Cl.
CPC ........ *G06F 21/6218* (2013.01); *G06F 21/602* (2013.01); *G06F 21/608* (2013.01);
(Continued)

(58) Field of Classification Search
CPC .................... G06F 21/45; G06F 21/76; G06F 2221/2141; G06F 21/6218; G06F 21/602;
(Continued)

(56) References Cited

U.S. PATENT DOCUMENTS 7,536,547 B2    5/2009  Van Den
8,209,263 B2 *  6/2012  Deolalikar ......... G06Q 20/3674
                                                        705/67

(Continued)

OTHER PUBLICATIONS

Fernandes, "Internet of Things: A New Era for Smart Printing?", Retrieved from Internet: https://www.ouellafernandes.com/2014/04/22/internet-things-new-era-smart-printing/, 2014, 3 Pages.
(Continued)

*Primary Examiner* — Edward Zee
(74) *Attorney, Agent, or Firm* — HP Inc. Patent Department

(57) ABSTRACT

In one example in accordance with the present disclosure, a computing device is described. The computing device includes an encryption device to encrypt, using an encryption key, a document to be rendered. A generating device generates multiple shares of a decryption key using a secret-sharing scheme. A threshold number of the multiple shares allows decryption of the document. A transmit device transmits different shares of the multiple shares to different devices. The document is rendered when the threshold number of multiple shares are rejoined at a rendering device.

19 Claims, 5 Drawing Sheets

(51) Int. Cl.
  *G06F 21/60* (2013.01)
  *G06F 21/72* (2013.01)

(52) U.S. Cl.
  CPC ...... *G06F 21/72* (2013.01); *G06F 2221/2107* (2013.01); *G06F 2221/2141* (2013.01)

(58) Field of Classification Search
  CPC .................. G06F 21/608; G06F 21/72; G06F 2221/2107; H04L 63/0884; H04L 63/18; H04L 63/0807
  See application file for complete search history.

(56) References Cited

U.S. PATENT DOCUMENTS

| | | | | |
|---|---|---|---|---|
| 9,094,379 | B1* | 7/2015 | Miller | H04L 9/0822 |
| 9,594,698 | B2 | 3/2017 | Koning et al. | |
| 2002/0178354 | A1* | 11/2002 | Ogg | G07B 17/00733 |
| | | | | 713/155 |
| 2005/0102512 | A1* | 5/2005 | Goh | H04L 9/3073 |
| | | | | 713/168 |
| 2006/0239736 | A1* | 10/2006 | Kitada | G06F 3/1286 |
| | | | | 400/62 |
| 2008/0263363 | A1 | 10/2008 | Jueneman et al. | |
| 2008/0266604 | A1* | 10/2008 | Kuroki | G06F 3/1213 |
| | | | | 358/1.16 |
| 2014/0070002 | A1 | 3/2014 | Pineau et al. | |
| 2014/0244017 | A1 | 8/2014 | Freiwirth et al. | |
| 2016/0044001 | A1* | 2/2016 | Pogorelik | H04L 9/085 |
| | | | | 713/168 |
| 2017/0005148 | A1 | 1/2017 | Kwon | |
| 2017/0288870 | A1* | 10/2017 | Przydatek | H04L 63/06 |

OTHER PUBLICATIONS

Gordon, "The "Internet of Things" (IoT) and Digital Printing: A Great Match", Retrieved from Internet: https://www.andanano.com/blog/the-internet-of-things-iot-and-digital-printing-a-great-match, Dec. 18, 2014, 5 Pages.

Thakkar, "Internet of Things and Multifactor Authentication", Bayometric, Retrieved from Internet: https://www.bayometric.com/internet-things-multifactor-authentication/, Dec. 27, 2016, 4 Pages.

* cited by examiner

ENCRYPTION KEY SHARES TO DIFFERENT DEVICES FOR RENDERING

BACKGROUND

In many facilities, such as office spaces or any number of public locations, community printers are disposed for use by multiple individuals. That is, users may have individual workstations for document creation. Once a document is created, it is sent to one such community printer for physical reproduction, which community printer serves various individuals. Such community systems have certain inefficiencies.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
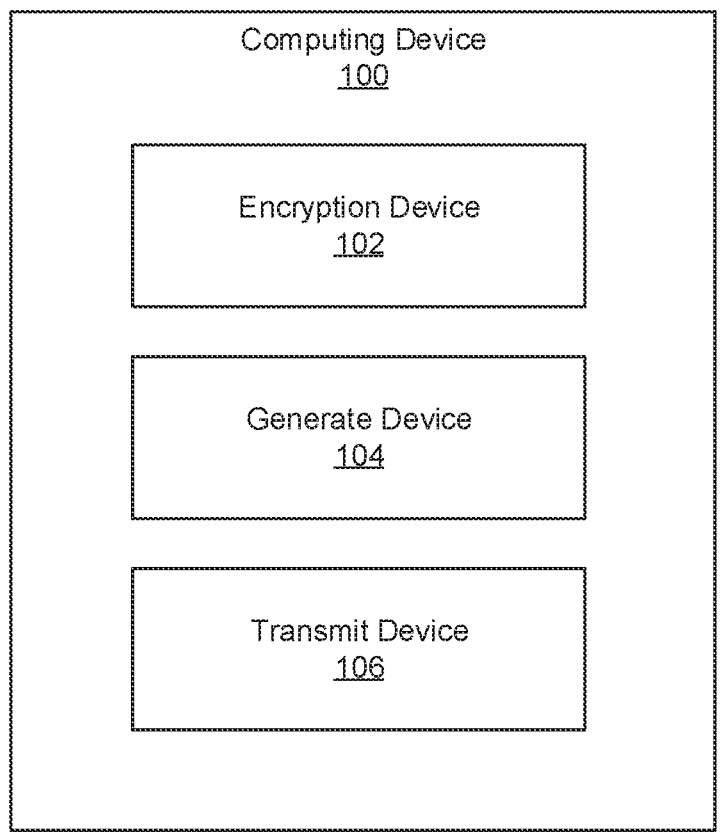
FIG. 1 is a block diagram of a computing device for transmitting decryption key shares to different devices for rendering, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In many facilities, such as office spaces or any number of public locations, community printers are disposed for use by multiple individuals. That is, users may have individual workstations for document creation. Once a document is created, it is sent to one such community printer for physical reproduction, which community printer serves various individuals. However, such community systems may not provide a desired level of security or privacy.

For example, after sending a print job to a printer to be printed, a user may forget to retrieve the document, which may then sit on the printer, viewable to anyone who passes by. In another example, a different user may inadvertently pick up a document from a printer believing it belongs to them, or may inadvertently grab the subject print job along with their own. Such scenarios can lead to a breach of security and/or confidentiality if documents are of a sensitive nature.

Security can be increased by encrypting a document. In this case, following a transmittal of the encrypted document to a printer or printing, a user associated with the print job goes to the printer and enters a password with which the document is decrypted. The document is then decrypted and printed. However, these systems as well are subject to security breaches. That is, a username and password are not cryptographically strong and can be broken with relative ease, for example through brute force techniques. Moreover, with the proliferation of technological devices, users have many different usernames and passwords and adding one more to that already long list may make a user less likely to remember a print job username and password.

Accordingly, the present specification describes systems and methods that overcome these and other complications. Specifically, a document may be encrypted and passed to a printing device. In some examples, the encryption may rely on a symmetric encryption key, meaning the key to encrypt the document and the key to decrypt the document are the same. In other examples, the encryption may be asymmetric, meaning the key to encrypt the document is different from the key to decrypt the document.

Through a secret-sharing scheme, multiple shares of the decryption key may be generated. Each of the shares may be passed to a different device. As a user is standing in front of the printing device, a certain number of those shares presented at the rendering device allow the document to be decrypted and printed. If any amount of shares less than the threshold number are presented, the document is not decrypted.

Specifically, the present specification describes a computing device. The computing device includes an encryption device to encrypt a document to be rendered using an encryption key. A generating device, using a secret-sharing scheme, generates multiple shares of a decryption key such that a threshold number of the multiple shares allow decryption of the document. A transmit device of the computing device transmits different shares of the multiple shares to different devices. In this example, the document is rendered when the threshold number of multiple shares are rejoined at a rendering device.

The present specification also describes a method of transmitting decryption key shares to different devices for document rendering. According to the method, a document to be rendered is encrypted using an encryption key. Using a secret-sharing scheme, multiple shares are generated from a decryption key such that a threshold number of the multiple shares allow reconstruction of the document. The different shares are then transmitted to different devices. The document is rendered when the threshold number of the multiple shares are rejoined at a rendering device.

The present specification also describes a computing system. The computing system includes a processor and a machine-readable storage medium coupled to the processor. An instruction set stored in the machine-readable storage medium is executed by the processor. The instruction set includes instructions to encrypt a document to be printed using an encryption key, instructions to generate, using a secret-sharing scheme, multiple shares of a decryption key, wherein a rejoining of a threshold number of the multiple shares allows decryption of the document, and instructions to transmit different shares of the multiple shares to different devices. The document is rendered when the threshold number of multiple shares are rejoined at a printer.

In summary, using such a computing device 1) allows for print job security by requiring multiple devices, each having different shares of a decryption key, to be present at a printer before a document can be printed or otherwise rendered; 2) avoids a cumbersome username and password entry; and 3) relies on multiple user devices, which may be on a person, during print job authorization. However, it is contemplated that the devices disclosed herein may address other matters and deficiencies in a number of technical areas.

As used in the present specification and in the appended claims, the term "rendering device" refers to a device that renders, either digitally or physically a document or other image. Examples of rendering devices include digital displays, printers, or other devices.

Further, as used in the present specification and in the appended claims, the term "a number of" or similar language is meant to be understood broadly as any positive number including 1 to infinity.

Turning now to the figures, FIG. 1 is a block diagram of a computing device (100) for transmitting decryption key shares to different devices for rendering, according to an example of the principles described herein. The computing device (100) may be any electronic device that can receive and/or generate a document to be rendered in either a digital or a physical format. Examples of such computing devices (100) include desktop computers, laptop computers, tablets, scanners, and personal digital assistants, among others.

The computing device (100) includes an encryption device (102) that encrypts a document to be rendered. Such encryption can be either symmetric or asymmetric. In symmetric encryption, the encryption key and decryption key are the same. In asymmetric encryption, the encryption key is different from the decryption key. A key is a random string of bits that is used to scramble the information in the document to be rendered. Upon reception at a rendering device, the decryption key is used to decrypt, or unscramble, the document such that it is legible and ready for rendering. As the decryption key is the vehicle by which an encrypted document is accessible, it may be desirable to decrease the likelihood of inadvertent/malicious unauthorized access to the decryption key.

Accordingly, a generate device (104) of the computing device (100), generates, from a secret-sharing scheme, multiple shares of the decryption key. Secret sharing refers to the distribution of a key amongst a group of participants, each of whom is allocated a share of the key. The key is reconstructed when a sufficient number, of possibly different types, of shares are combined together. That is, an individual share of the key, by itself is ineffective. In one type of secret sharing scheme, a share of the key is given to a number of recipients, and the key will be reconstructed from their shares when specific conditions are fulfilled. For example, the shares may be distributed to each recipient such that that a threshold number of recipients can together reconstruct the key, but no group of less than the threshold number can reconstruct the key. Doing so increases the security provided by an encryption as these different shares are distributed and reduce the likelihood of an attacker/entity collecting enough shares to reconstruct the decryption key. That is, the decryption key security is increased as it is a distributed key, thus reducing the likelihood that an entity will be able to acquire the portions used to decrypt a document.

As described, a threshold number of these multiple shares, when rejoined, will allow for a decryption of the document. Note that the threshold number may be less than the total number of shares. That is of the four shares, rejoining three may be sufficient to decrypt the document. However, if the threshold number is three, then the rejoining of two shares will not facilitate a decryption, and subsequent release of the print job.

A transmit device (106) of the computing device (100) transmits the different shares of the multiple shares to different devices. In some cases, the different devices include at least a rendering device on which the document is to be rendered and at least one other device. Sending at least one of the shares to the rendering device increases print job security as the print job is decrypted when the particular printing device on which it is to be printed participates in key reconstruction. In other examples, the different devices do not include a rendering device, i.e., printer, to which the document is to be rendered.

In either case, the devices that are not rendering devices may correspond to a single user. For example, a first share of the decryption key could be sent to the rendering device on which the document is to be rendered, a second share could be sent to a network-connected watch of the user, and a third share could be sent to a network-connected mobile device of the user. As described above, such a system enhances rendering security, as a breach of just one of the aforementioned devices will not be sufficient to allow decryption and access of the document.

In another example, the different devices may correspond to different users. That is a first share of the decryption key may be sent to a first user's mobile device and a second share of the decryption key may be sent to a second user's mobile device. Accordingly, the document is decrypted and rendered when at least the first user and the second user, and their corresponding devices, are present at the rendering device. In so doing, a rejoin engine recombines the various shares of the decryption key, responsive to there being more than the threshold number of various shares present at the rendering device.

Such a system allows for increased security in document rendering. That is, even if all of the multiple devices are stolen or successfully attacked, the document is not exposed because they do not have enough shares between them to decrypt the document. Until the multiple devices are present at the rendering device, there is not enough information on the rendering device to decrypt the document, even in the case where the encrypted document is sent directly to the rendering device. The unencrypted document exists for a short while on the rendering device, as it can be decrypted, rendered, and then deleted.

Figure 2:
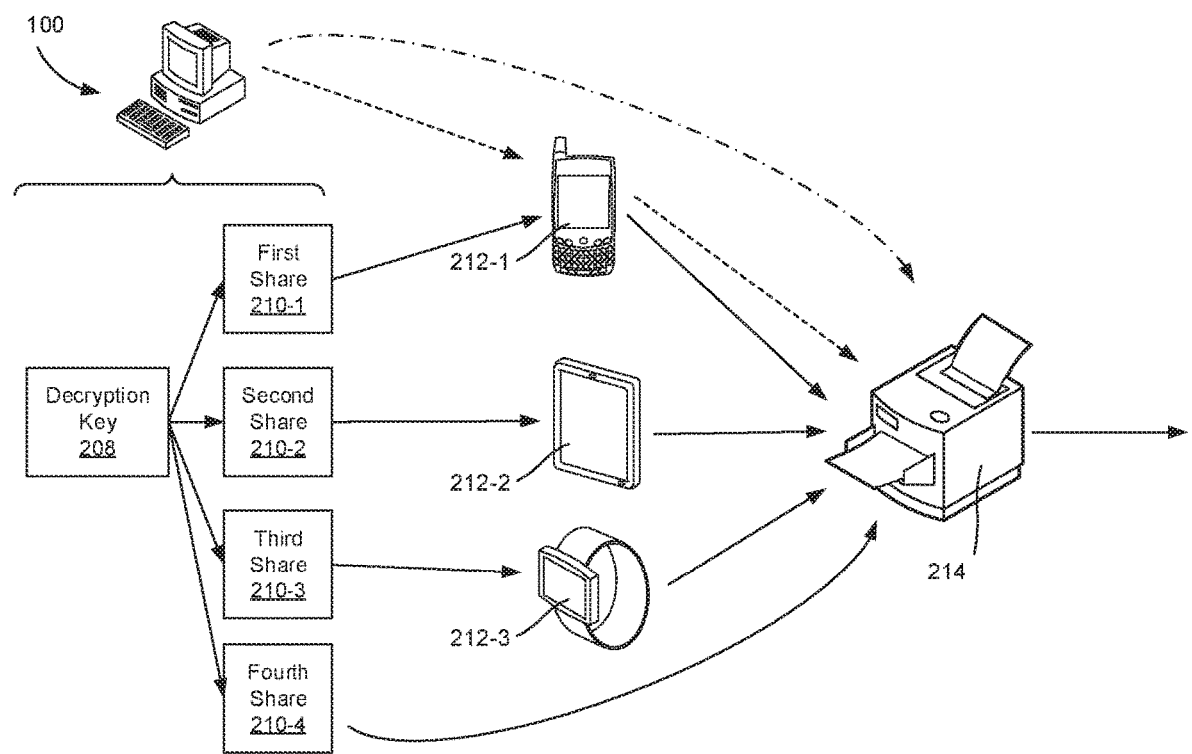
FIG. 2 is a diagram of an environment of device for transmitting decryption key shares to different devices for rendering, according to an example of the principles described herein.

FIG. 2 is a diagram of an environment of transmitting decryption key shares (210) to different devices (212) for rendering, according to an example of the principles described herein. As described above, a computing device (100) uses an encryption key to encrypt a document such that the document is accessible in a decrypted format to just an authorized entity. As described above the decryption key (208) associated with the encryption key may be used to generate multiple shares (210). While FIG. 2 depicts a first share (210-1), a second share (210-2), a third share (210-3), and a fourth share (210-4), the decryption key (208) may be divided into any number of sections (210). Note that in FIG. 2, the transmission of the decryption key (208) and its corresponding shares (210) are indicated by solid arrows, while transmission of an encrypted document is indicated by dashed arrows and dashed-dot arrows.

These shares can then be passed to different devices (212). This may occur without additional user input above selecting to render a document. For example, upon selecting a "Print" button on the computing device (100), the decryption key (208) may be divided into shares (210) and the shares (210) passed to the various devices (212). Specifically, a first share (210-1) may be sent to a first device (212-1). Similarly, a second share (210-2) and a third share (210-3) may be sent to a second device (212-2) and a third device (212-3), respectively. Note again, that as described above, each of the different devices (212) may correspond to one user or to multiple users.

In addition to sending different shares (210) to different devices (212), in some examples, at least one of the shares (210) can be sent directly to the rendering device (214). That is, in addition to receiving the encrypted document, the rendering device (214), such as a printer, may receive a fourth share (210-4). Accordingly, a malicious entity would not only have to acquire the devices (212) on which shares (210) of the decryption key (208) are stored, but would also have to be physically present at the rendering device (214) to acquire a sufficient number of shares (210) to facilitate document decryption.

When the threshold number of shares (210) have been presented at the rendering device (214), they may be rejoined, for example by a rejoin engine, and the document decrypted and/or rendered. In some examples, the shares (210) may be communicated to the rendering device (214) via an encrypted network. That is, a user may establish a secured connection, over a secured authenticated channel, for example a short-range network, which may occur previous to such rendering or at the same time as such rendering. Accordingly, when the devices (212) are within a predetermined proximity, the rendering device (214) can acquire the shares (210) to begin rejoining of the decryption key (208) at the rendering device (214).

Note that in FIG. 2 the transmission of the document, as indicated by the dashed and dashed-dot line is separate from the transmission of the entire decryption key (208). Doing so enhances security as hacking a device that includes the encrypted document will not necessarily result in a hacking of the entire decryption key (208), but at most a share (210), which share (210) by itself does not allow for decryption of the encrypted document.

In some examples, the computing device (100), in addition to transmitting the decryption key shares (210) to various devices (212), may transmit the encrypted document. In one example, the encrypted document is transmitted to at least one of the devices (212), in this example, a first device (212-1). Then, when in proximity to the rendering device (214), the encrypted document, in addition to the first share (210-1) of the decryption key (208) can be passed to the rendering device (214) for decrypting.

In another example, the computing device (100) transmits the encrypted document directly to the rendering device (214), i.e., the printer. Doing so ensures that any device (212) which may have access to a share (210) of the decryption key (208) will not have access to the document intended to be decrypted with the decryption key (208).

Figure 3:
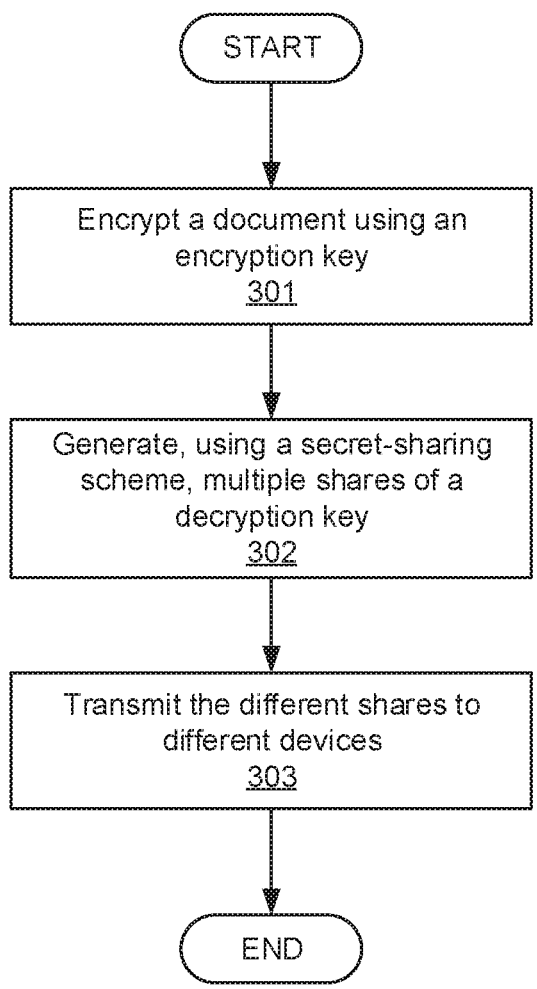
FIG. 3 is a flowchart of a method for transmitting decryption key shares to different devices for rendering, according to an example of the principles described herein.
Figure 4:
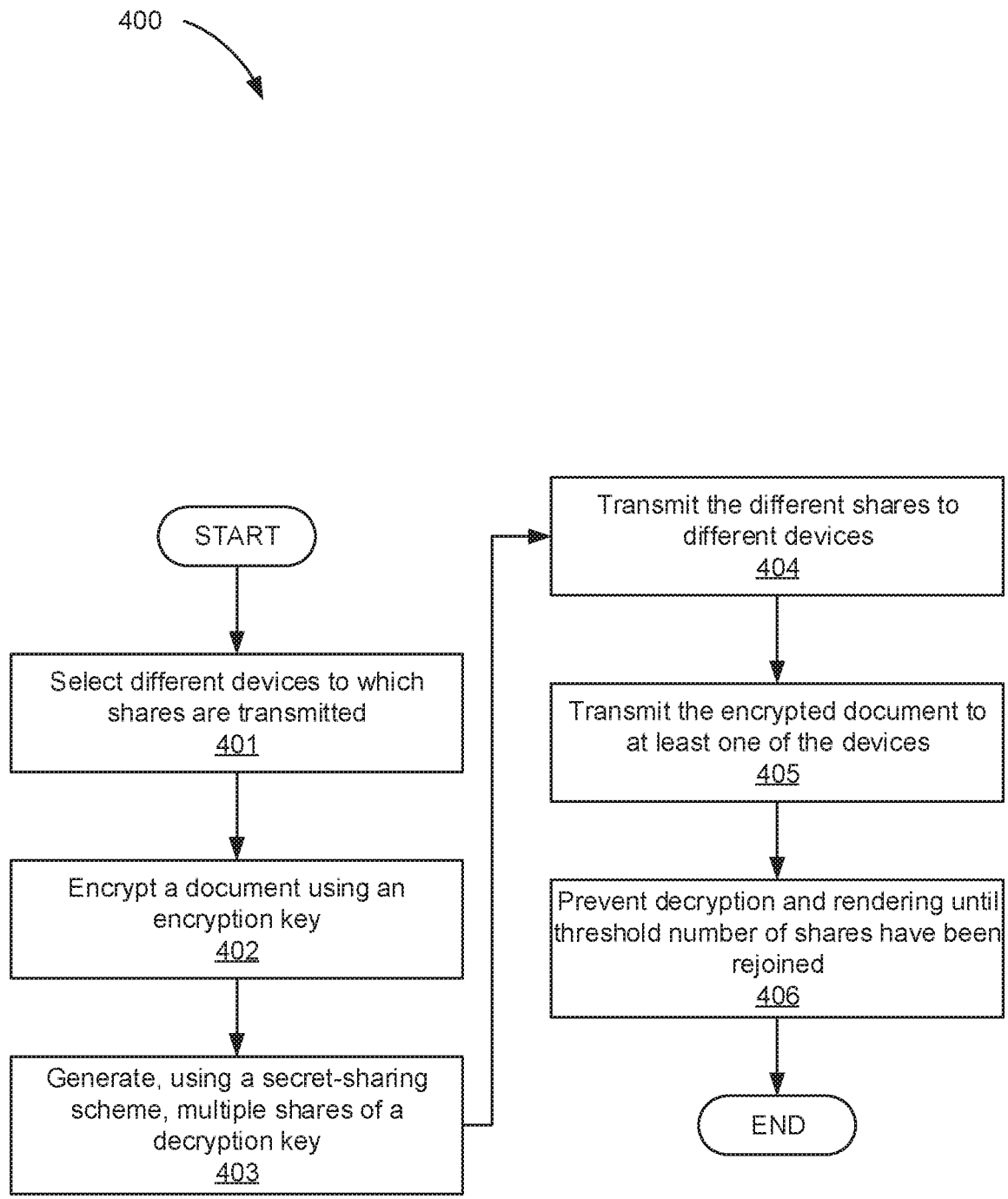
FIG. 4 is a flowchart of a method for device for transmitting decryption key shares to different devices for rendering, according to another example of the principles described herein.

FIG. 3 is a flowchart of a method (300) for transmitting decryption key shares (FIG. 2, 210) to different devices (FIG. 2, 212) for rendering, according to an example of the principles described herein. As a general note, the methods (300, 400) may be described below as being executed or performed by at least one device, for example, the computing device (FIG. 1, 100). Other suitable systems and/or computing devices may be used as well. The methods (300, 400) may be implemented in the form of executable instructions stored on at least one machine-readable storage medium of at least one of the devices and executed by at least one processor of at least one of the device. Alternatively, or in addition, the methods (300, 400) may be implemented in the form of electronic circuitry (e.g., hardware). While FIGS. 3 and 4 depict operations occurring in a particular order, a number of the operations of the methods (300, 400) may be executed concurrently or in a different order than shown in FIGS. 3 and 4. In some examples, the methods (300, 400) may include more or less operations than are shown in FIGS. 3 and 4. In some examples, a number of the operations of the methods (300, 400) may, at certain times, be ongoing and/or may repeat. Include questions as you come up with them According to the method (300), a document to be rendered is encrypted (block 301) using an encryption key. The encryption key may be a random string of bits that is used to scramble a document such that it is illegible, or inaccessible to inadvertent or malicious access. As described above, the encryption key may be the same as or different than the decryption key The decryption key (FIG. 2, 208) is then used in a secret-sharing scheme to generate (block 302) multiple shares (FIG. 2, 210). The divided shares (FIG. 2, 210) when rejoined allow the decrypting of the associated document. Generating (block 302) these decryption key (FIG. 2, 208) shares (FIG. 2, 210) increases the security of the rendering operation. That is, a malicious user would have to acquire multiple of these different shares (FIG. 2, 210) before being able to access the associated document, which may be encrypted due to sensitive or confidential reasons.

The different shares (FIG. 2, 210) are then transmitted (block 303) to different devices (FIG. 2, 212). For example, the different shares (FIG. 2, 210) may be transmitted (block 303) to different devices (FIG. 2, 212) corresponding to a single user such that, to decrypt a document, a user would present a threshold number of those different shares (FIG. 2, 210) at the rendering device (FIG. 2, 214).

Note that in some examples the devices (FIG. 2, 212) to which the different shares (FIG. 2, 210) are sent may include the rendering device (FIG. 2, 214). A specific example of this scenario is now provided. In this example, a first share (FIG. 2, 210-1) may be passed to a mobile device (FIG. 2, 212-1) of a user. Similarly, a second share (FIG. 2, 210-2) and a third share (FIG. 2, 210-3) may be sent to a tablet device (FIG. 2, 212-2) and a smart watch device (FIG. 2, 212-3) both corresponding to the same user. A fourth share (FIG. 2, 210-4) may be sent to the rendering device (FIG. 2, 214) itself. In this example, the threshold number of shares (FIG. 2, 210) for decrypting the document is three. Accordingly, if the user, wearing the smart watch device (FIG. 2, 212-3) approaches the rendering device (FIG. 2, 214), and establishes a secure connection, the user may not be permitted to decrypt the document as there are less than the threshold amount of shares (FIG. 2, 210) presented, one from the rendering device (FIG. 2, 214) and one from the smart watch device (FIG. 2, 212-3).

By comparison, if the user, wearing a smart watch device (FIG. 2, 212-3) and carrying a mobile device (FIG. 2, 212-1) approaches the rendering device (FIG. 2, 214), and establishes a secure connection, the user may be permitted to decrypt the document as there are now the threshold three shares (FIG. 2, 210), one from the rendering device (FIG. 2, 214), one from the smart watch device (FIG. 2, 212-3), and one from the mobile device (FIG. 2, 212-1). As has been demonstrated, such action reduces the likelihood that a decryption key, and thereby an encrypted document, will fall into malicious hands.

In another example, the different shares (FIG. 2, 210) are transmitted (block 303) to devices (FIG. 2, 212) corresponding to different users. In this example, a first share (FIG. 2, 210-1) may be passed to a mobile device (FIG. 2, 212-1) belonging to a first user. A second share (FIG. 2, 210-2) may be passed to a tablet device (FIG. 2, 212-2) belonging to a second user and a third share (FIG. 2, 210-3) may be passed to a smart watch device (FIG. 2, 212-3) belonging to a third user. A fourth share (FIG. 2, 210-4) may be sent to the rendering device (FIG. 2, 214) itself. In this example, the threshold number of shares (FIG. 2, 210) for decrypting the document is three. Accordingly, if the first user with their mobile device (FIG. 2, 212-1) approaches the rendering device (FIG. 2, 214), and establishes a secure connection, the user may not be permitted to decrypt the document as there less than the threshold number of shares (FIG. 2, 210) presented, one from the rendering device (FIG. 2, 214) and one from the mobile device (FIG. 2, 212-1).

By comparison, if the first user with the mobile device (FIG. 2, 212-1) and the second user with the tablet device (FIG. 2, 212-2) approach the rendering device (FIG. 2, 214), and establishes a secure connection, the users may be permitted to decrypt the document as there are now the threshold three shares (FIG. 2, 210), one from the rendering device (FIG. 2, 214), one from the tablet device (FIG. 2, 212-2), and one from the mobile device (FIG. 2, 212-1). As has been demonstrated, such action reduces the likelihood that a decryption key, and thereby an encrypted document, will fall into malicious hands.

FIG. 4 is a flowchart of a method (400) for transmitting decryption key shares (FIG. 2, 210) to different devices (FIG. 2, 212) for rendering, according to another example of the principles described herein. According to the method (400), different devices (FIG. 2, 212) to which the shares (FIG. 2, 210) are transmitted are selected (block 401). This may be performed by a managing entity such as a network administrator, employer, etc. via a management computing device. For example, an employer may set a user profile wherein it is determined what devices (FIG. 2, 212) for that user will receive shares (FIG. 2, 210) of a decryption key (FIG. 2, 208) used by that user and which, if any devices (FIG. 2, 212) for other users will receive shares (FIG. 2, 210) of the decryption key (FIG. 2, 208). Each subsequent document encryption/decryption can then follow the settings in this user profile. The document is then encrypted (block 402) as described above in connection with FIG. 3. That is an encryption device (FIG. 1, 102) of a computing device (FIG. 1, 100) encrypts (block 402) the document.

From the decryption key (FIG. 2, 208) a set of shares (FIG. 2, 210) can be generated (block 403). That is a generate device (FIG. 1, 104) of a computing device (FIG. 1, 100) generates (block 403) a set of shares (FIG. 2, 210). A threshold number of shares (FIG. 2, 210) will be needed to rejoin the different portions of the decryption key (FIG. 2, 208). A specific example of share generation (block 403) is now provided. In this example, assuming there are D, number of devices (FIG. 2, 212), a secret-sharing policy may indicate that a threshold number of devices, P, should be present at a rendering device (FIG. 2, 214) to allow rejoinment of the shares (FIG. 2, 210), which threshold number of devices, P, is less than D. A number of shares, N, are then generated (block 403) using a secret-sharing scheme that indicates a threshold number of shares, K, which should be present at the rendering device (FIG. 2, 214) to allow rejoinment of the shares (FIG. 2, 210), and decryption of the document. As a specific example, the threshold number of shares, K, may be defined as $K=N/2+P$.

In this example, A first portion of the shares (FIG. 2, 210), i.e., the first portion defined as the first N/2 shares (FIG. 2, 210), are distributed evenly amongst the D devices (FIG. 2, 212) and the remaining shares (FIG. 2, 210), a second portion defined as a second set of N/2 shares (FIG. 2, 210), are distributed to the rendering device (FIG. 2, 214). Doing so ensures 1) that at least P devices and a rendering device (FIG. 2, 214) are present to allow decryption of the document, 2) that all the devices (FIG. 2, 212) together don't have enough shares (FIG. 2, 210) to decrypt the document; and that even if there are multiple rendering devices (FIG. 2, 214) and all are attacked, they cannot decrypt the document without P devices (FIG. 2, 212) being present as well.

The different shares (FIG. 2, 210) are then transmitted (block 404) to the different devices (FIG. 2, 212). That is a transmit device (FIG. 1, 106) of a computing device (FIG. 1, 100) transmits (block 404) the shares (FIG. 2, 210) to the different devices. This may be performed as described above in regards to FIG. 3. This type of sharing easily ensures that even all the non-rendering devices cannot reconstruct the decryption key together, nor can the rendering device (FIG. 2, 214).

By so doing, rendering security is even further increased. That is, a malicious entity would have to hack a first number of devices (FIG. 2, 212) and a rendering device (FIG. 2, 214) to obtain sufficient shares (FIG. 2, 210) to decrypt the document. The encrypted document can also be transmitted (block 405) to at least one of the devices (FIG. 2, 212). This may be performed as described above in regards to FIG. 2.

According to the method (400), the decryption and rendering of the document is prevented (block 406) until a threshold number of shares (FIG. 2, 210) have been rejoined. For example, as described above, if a threshold number of shares (FIG. 2, 210) for a particular document is set to three, the system would prevent decryption and rendering until more shares (FIG. 2, 210) are rejoined at the rendering device (FIG. 2, 214).

Figure 5:
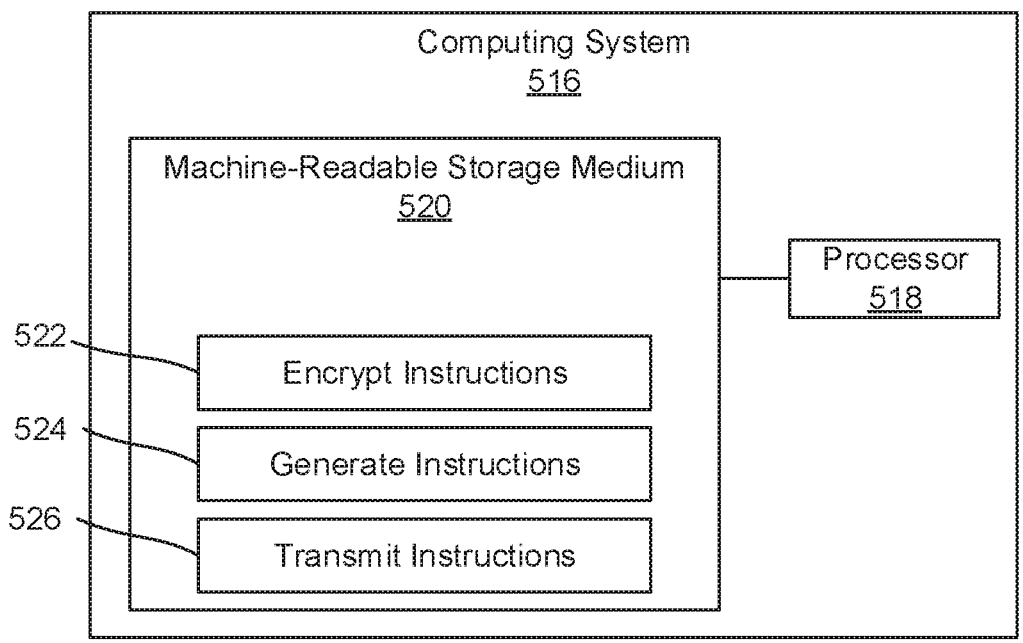
FIG. 5 is a diagram of a computing system to device for transmitting decryption key shares to different devices for rendering, according to an example of the principles described herein.

FIG. 5 is a diagram of a computing system (516) to transmitting decryption key shares (FIG. 2, 210) to different devices (FIG. 2, 212) for rendering, according to an example of the principles described herein. To achieve its desired functionality, the computing system (516) includes various hardware components. Specifically, the computing system (516) includes a processor (518) and a machine-readable storage medium (520). The machine-readable storage medium (520) is communicatively coupled to the processor (518). The machine-readable storage medium (520) includes a number of instruction sets (522, 524, 526) for performing a designated function. The machine-readable storage medium (520) causes the processor (518) to execute the designated function of the instruction sets (522, 524, 526).

Although the following descriptions refer to a single processor (518) and a single machine-readable storage medium (520), the descriptions may also apply to a computing system (516) with multiple processors and multiple machine-readable storage mediums. In such examples, the instruction sets (522, 524, 526) may be distributed (e.g., stored) across multiple machine-readable storage mediums and the instructions may be distributed (e.g., executed by) across multiple processors.

The processor (518) may include at least one processor and other resources used to process programmed instructions. For example, the processor (518) may be a number of central processing units (CPUs), microprocessors, and/or other hardware devices suitable for retrieval and execution of instructions stored in machine-readable storage medium (520). In the computing system (516) depicted in FIG. 5, the processor (518) may fetch, decode, and execute instructions (522, 524, 526) for detecting failing components in a device. In one example, the processor (518) may include a number of electronic circuits comprising a number of electronic components for performing the functionality of a number of the instructions in the machine-readable storage medium (520). With respect to the executable instruction, representations (e.g., boxes) described and shown herein, it should be understood that part or all of the executable instructions and/or electronic circuits included within one box may, in alternate examples, be included in a different box shown in the figures or in a different box not shown.

The machine-readable storage medium (520) represent generally any memory capable of storing data such as programmed instructions or data structures used by the computing system (516). The machine-readable storage medium (520) includes a machine-readable storage medium that contains machine-readable program code to cause tasks to be executed by the processor (518). The machine-readable storage medium (520) may be tangible and/or non-transitory storage medium. The machine-readable storage medium (520) may be any appropriate storage medium that is not a transmission storage medium. For example, the machine-readable storage medium (520) may be any electronic, magnetic, optical, or other physical storage device that stores executable instructions. Thus, machine-readable storage medium (520) may be, for example, Random Access Memory (RAM), a storage drive, an optical disc, and the like. The machine-readable storage medium (520) may be disposed within the computing system (516), as shown in FIG. 5. In this situation, the executable instructions may be "installed" on the computing system (516). In one example, the machine-readable storage medium (520) may be a portable, external or remote storage medium, for example, that allows the computing system (516) to download the instructions from the portable/external/remote storage medium. In this situation, the executable instructions may be part of an "installation package". As described herein, the machine-readable storage medium (520) may be encoded with executable instructions for dividing an encryption key (FIG. 2, 208) to different devices (FIG. 2, 212) for rendering.

Referring to FIG. 5, encrypt instructions (522), when executed by a processor (518), may cause the computing system (516) to encrypt a document to be printed using an encryption key. Generate instructions (524), when executed by a processor (518), may cause the computing system (516) to generate, using a secret-sharing scheme, multiple shares (FIG. 2, 210) of a decryption key (FIG. 2, 208). A rejoining of a threshold number of the multiple shares (FIG. 2, 210) for the decryption key (FIG. 2, 208) allows decryption of the document. Transmit instructions (526), when executed by a processor (518), may cause the computing system (516) to transmit different shares (FIG. 2, 210) of the multiple shares (FIG. 2, 210) to different devices (FIG. 2, 212). The document is rendered when the threshold number of the multiple shares (FIG. 2, 210) for the decryption key (FIG. 2, 208) are rejoined at a printer.

In some examples, the processor (518) and machine-readable storage medium (520) are located within the same physical component, such as a server, or a network component. The machine-readable storage medium (520) may be part of the physical component's main memory, caches, registers, non-volatile memory, or elsewhere in the physical component's memory hierarchy. In one example, the machine-readable storage medium (520) may be in communication with the processor (518) over a network. Thus, the computing system (516) may be implemented on a user device, on a server, on a collection of servers, or combinations thereof.

The computing system (516) of FIG. 5 may be part of a general-purpose computer. However, in some examples, the computing system (516) is part of an application specific integrated circuit.

In summary, using such a computing device 1) allows for print job security by requiring multiple devices, each having different sections of an encryption key, to be present at a printer before a document can be printed or otherwise rendered; 2) avoids a cumbersome username and password entry; and 3) relies on multiple user devices, which may be on a person, during print job authorization. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing device comprising:
a processor; and
a non-transitory machine-readable storage medium storing instructions executable on the processor to:
encrypt a document using an encryption key to produce an encrypted document;
transmit the encrypted document for rendering by a rendering device;
using a secret-sharing scheme, generate multiple different shares of a decryption key such that a threshold number of the multiple different shares allow decryption of the encrypted document; and
transmit, over a network as part of a rendering operation to display or print the document, a first share of the multiple different shares to the rendering device, and a second share of the multiple different shares to a user device that is to communicate the second share to the rendering device when the user device is moved within a predetermined proximity of the rendering device to complete the rendering operation, wherein a rejoinder of the threshold number of the multiple different shares at the rendering device allows for the decryption of the encrypted document to produce a decrypted document and displaying or printing of the decrypted document at the rendering device.

2. The computing device of claim 1, wherein the encrypting of the document and the transmitting of the encrypted document are performed in response to an initiation of the rendering operation at the computing device.

3. The computing device of claim 1, wherein the instructions are executable on the processor to transmit, over the network as part of the rendering operation, a third share of the multiple different shares to a further user device that is to communicate the third share to the rendering device when the further user device is moved within the predetermined proximity of the rendering device to complete the rendering operation.

4. The computing device of claim 1, wherein the user device is to communicate the second share to the rendering device over a short-range network.

5. The computing device of claim 1, wherein the instructions are executable on the processor to generate the multiple different shares of the decryption key in response to a user request at the computing device to render the document.

6. The computing device of claim 1, wherein the instructions are executable on the processor to generate the multiple different shares of the decryption key in response to a user request at the computing device to print the document.

7. A method comprising:

receiving, at a rendering device from a computing device as part of a rendering operation, an encrypted document to be displayed or printed by the rendering device in the rendering operation;

receiving, at the rendering device from the computing device, a first share of a decryption key as part of the rendering operation;

receiving, at the rendering device from a different device when moved to within a predetermined proximity of the rendering device to complete the rendering operation, a different second share of the decryption key, the first share and the different second share generated using a secret-sharing scheme and the different second share being transmitted by the computing device to the different device in response to an initiation of the rendering operation at the computing device;

in response to receiving the first share and the different second share of the decryption key, determining, at the rendering device, whether a threshold number of shares of the decryption key is available at the rendering device; and in response to determining that the threshold number of shares of the decryption key is available at the rendering device, decrypting, at the rendering device, the encrypted document to produce a decrypted document, and display or print the decrypted document as part of the rendering operation.

8. The method of claim 7, wherein the different device comprises a mobile device.

9. The method of claim 7, wherein the different device comprises a smart watch.

10. The method of claim 7, comprising preventing, at the rendering device, the decryption of the encrypted document until the threshold number of shares of the decryption key is available at the rendering device.

11. The method of claim 7, wherein the rendering operation is initiated at the computing device by a user associated with the different device.

12. The method of claim 7, wherein the different second share is received at the rendering device over a short-range network from the different device.

13. A rendering device comprising:

a processor;

a non-transitory machine-readable storage medium storing instructions executable on the processor to:

receive, at the rendering device from a computing device as part of a rendering operation, an encrypted document to be displayed or printed by the rendering device;

receive, from respective different devices when moved to within a predetermined proximity of the rendering device to complete the rendering operation, different shares of a decryption key, the different shares generated using a secret-sharing scheme and transmitted by the computing device to the different devices in response to an initiation of the rendering operation at the computing device;

in response to receiving the different shares of the decryption key, determine whether a threshold number of shares of the decryption key is available at the rendering device; and in response to determining that the threshold number of shares of the decryption key is available at the rendering device, decrypt the encrypted document to produce a decrypted document, and display or print the decrypted document as part of the rendering operation.

14. The rendering device of claim 13, wherein the different devices comprise a mobile device.

15. The rendering device of claim 13, wherein the different devices comprise a smart watch.

16. The rendering device of claim 13, wherein a further share of the decryption key is present in the rendering device, and the instructions are executable on processor to determine whether a collection of the further share and the different shares received from the respective different devices satisfies the threshold number of shares of the decryption key.

17. The rendering device of claim 16, wherein the instructions are executable on the processor to receive the further share of the decryption key from the computing device.

18. The rendering device of claim 13, wherein the different devices are associated with a user that initiated the rendering operation at the computing device.

19. The rendering device of claim 13, wherein the different devices are associated with different users.

* * * * *